Figure 1:
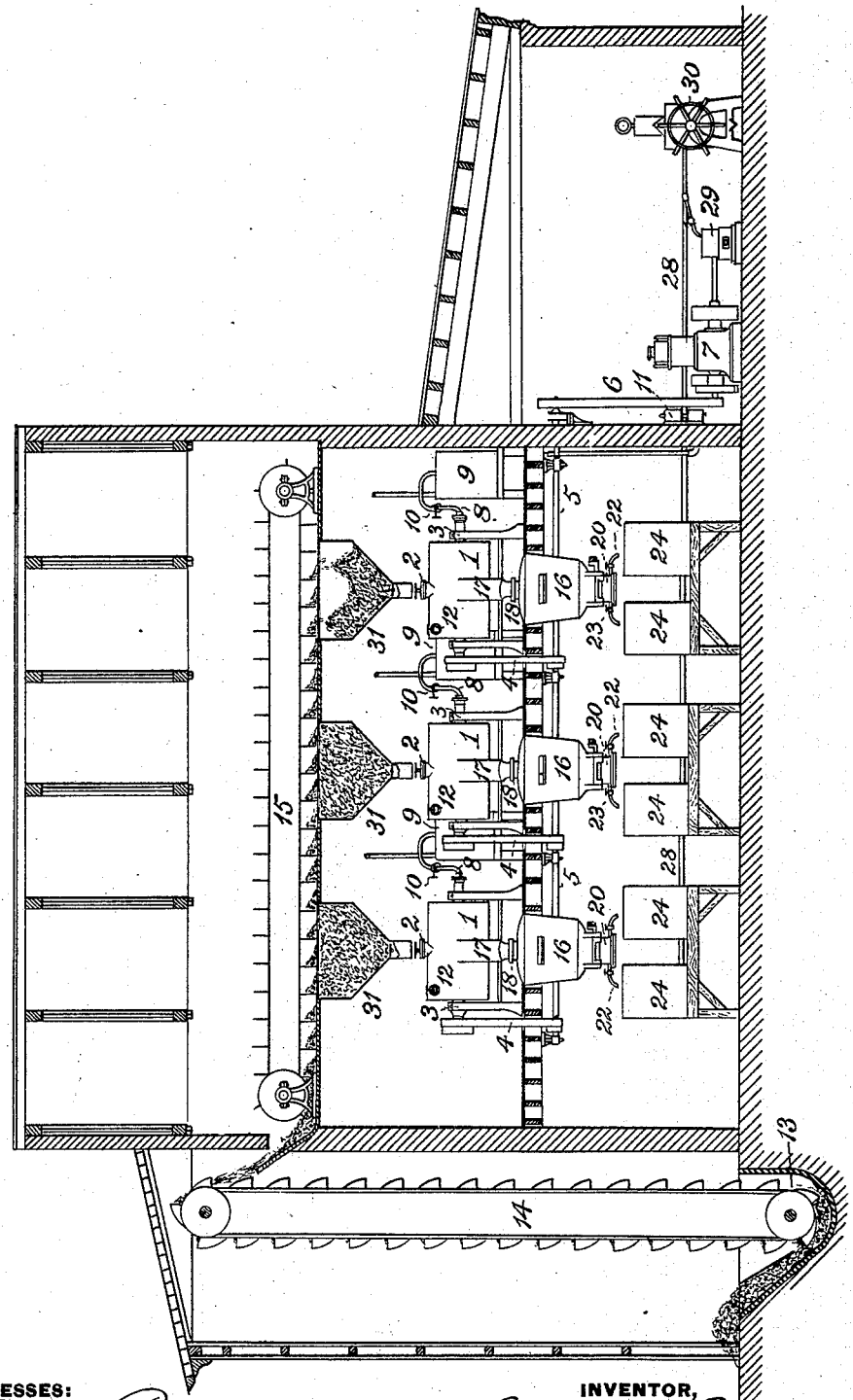

(No Model.) 3 Sheets—Sheet 1.
G. W. GOETZ.
PLANT FOR THE EXTRACTION OF METALS FROM ORES.

No. 416,780. Patented Dec. 10, 1889.

WITNESSES: INVENTOR,
George W. Goetz
by George H. Christy Att'y.

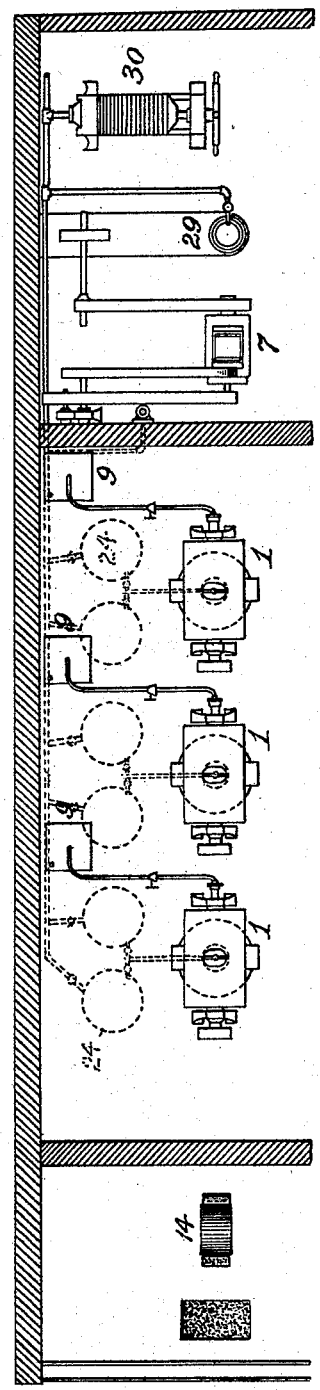

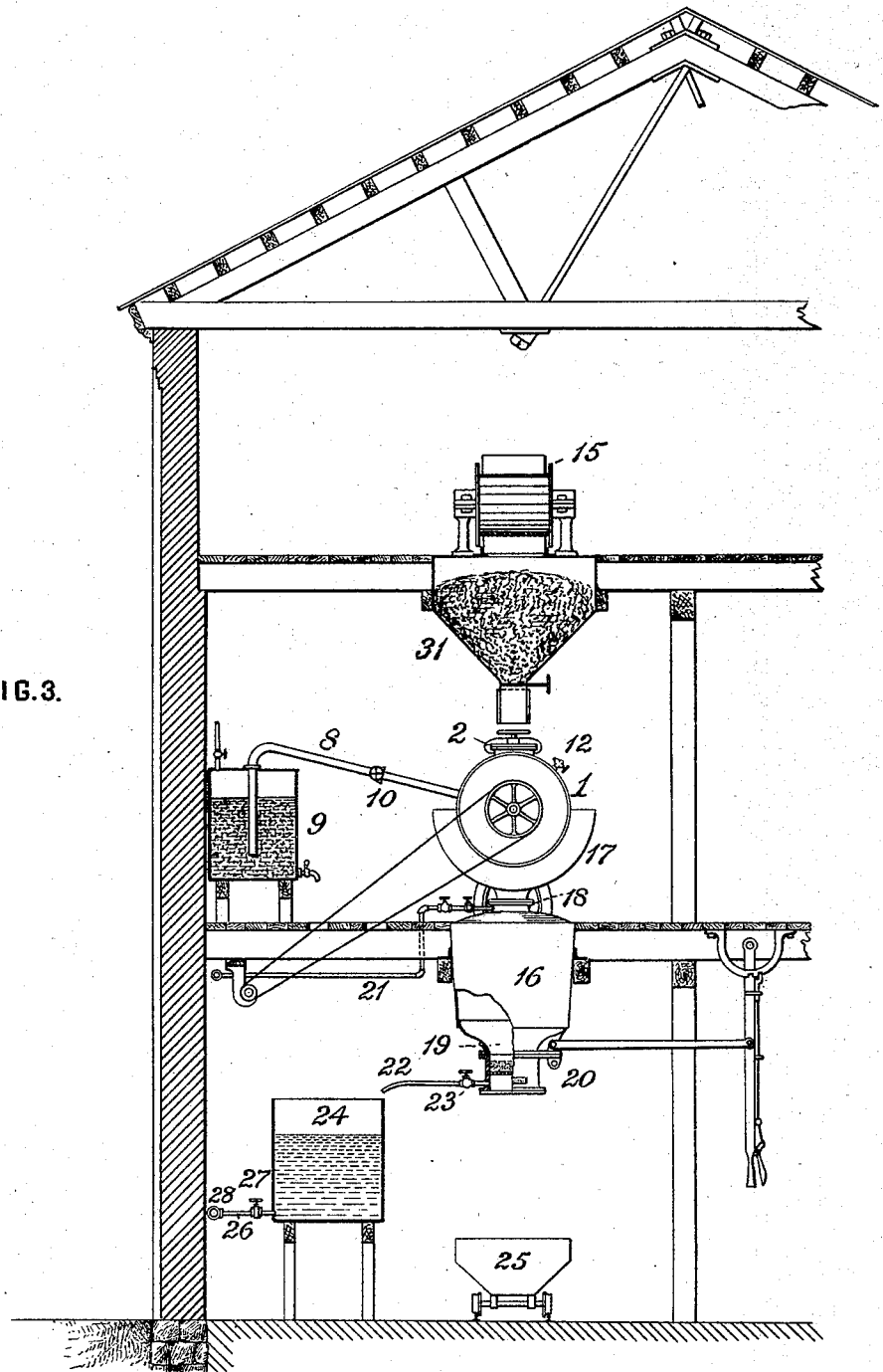

UNITED STATES PATENT OFFICE.

GEORGE W. GOETZ, OF PITTSBURG, PENNSYLVANIA, ASSIGNOR TO THE ORE REDUCTION COMPANY, OF SAME PLACE.

PLANT FOR THE EXTRACTION OF METALS FROM ORES.

SPECIFICATION forming part of Letters Patent No. 416,780, dated December 10, 1889.

Application filed March 6, 1889. Serial No. 302,047. (No model.)

*To all whom it may concern:*

Be it known that I, GEORGE W. GOETZ, a citizen of the United States, residing at Pittsburg, in the county of Allegheny and State of Pennsylvania, have invented or discovered a certain new and useful Improvement in Plants for the Extraction of Metals from Ores, of which improvement the following is a specification.

The object of my invention is to provide an apparatus or plant by which the extraction of metals from ores may be conducted more expeditiously and economically and within materially - reduced compass as compared with those ordinarily employed; to which end my invention, generally stated, consists in a plant embracing a rotatable ore-treating cylinder, an absorbing-tank connected by a pipe therewith, an ejector interposed between the cylinder and tank, a closed desiccator located below the ore-treating cylinder, a precipitating-vessel located in position to receive liquid discharged from the desiccator, a centrifugal separator, a filter-press, and pipes controlled by valves and leading from the precipitating-vessel to the centrifugal separator and filter-press, respectively.

The improvement claimed is hereinafter fully set forth.

The apparatus heretofore known, and which has been ordinarily applied in the extraction of the precious metals from their ores by the solution of ore pulp in rotating vessels under the action of chlorine or other gas, involves the employment of a large open filter-bed, into which the solid and liquid charge of the rotating vessel is discharged after the desired solution of the metal has been effected, and through which the solution percolates into a vat or tank in which the metal is precipitated, and several days are required to admit of the settling of the precipitates before the supernatant liquid can be drawn off and the precipitates treated for the recovery of the precious metals therefrom. The evolution of gas from the cylinder in effecting the discharge of its contents and from the wet surface of the pulp on the open filter is also a material objection, the gas being offensive and detrimental to the health of the workmen and rendering it impossible at times for them to remain in the vicinity of the apparatus.

Another disadvantage encountered in apparatus of this character is that a large amount of space is required to admit of the employment of a sufficient number of precipitating-tubs for working the daily product, as about one ton of water is required per ton of ore, and hence, in view of the time required for the settling of the precipitates, it results that a very great capacity of tankage is necessary.

The objections above indicated are obviated by my improvement, in the operation of which the delay in the settling of the precipitates and the storage-space for such settling are avoided by the separation of the solid from the liquid portions either centrifugally or by pressure, or both, as the case may be.

In the accompanying drawings, Figure 1 is a side view in elevation of a plant for the extraction of metals from ores embodying my invention; Fig. 2, a plan or top view of so much of the same as is below the feed-hoppers, and Fig. 3 a vertical transverse section through the same.

The plant illustrated embodies a series of independent ore-treating cylinders, each having a separate desiccator and precipitating-vessels, all of the latter delivering solution to a common centrifugal separator and filter-press, so that the operation may be conducted by the coincident employment of the entire series of ore-treating cylinders, or with any one or more of the same, as may from time to time be desired or requisite. The ore-treating cylinders 1, which are arranged in line longitudinally, are provided with suitable charging-openings, closed by doors 2, and with end journals which rotate in bearings 3, one of the journals of each cylinder carrying a fast and a loose pulley, around one or the other of which, according as the cylinder is to be rotated or remain at rest, a belt 4 from a counter-shaft 5 passes, the counter-shaft 5 being rotated by a belt 6 from the main shaft of an engine 7 or other prime mover. A gas-discharge pipe 8 leads through one of the trunnions of each of the cylinders 1 to an absorbing-tank 9, an exhauster 10, which is supplied with fluid under pressure— as, for example, air from a compressing-pump 11—being interposed between the cylinder and absorbing-tank. Each cylinder is also provided with an air-inlet valve 12, and the construction as above described, the special object of which is to prevent the escape of gas in discharging and charging the cylinder, is substantially similar to that set forth in a separate application filed by me November 23, 1888, Serial No. 291,687, and is not, singly or specifically, claimed as of my present invention.

Ore which has been properly pulverized is supplied to the cylinders through the openings governed by the doors 2, the supply being preferably effected from a series of feed-hoppers 31, located above the cylinders, the ore being raised from a bin or receptacle 13, located at or near the ground line or floor of the works, by an elevator 14, by which it is delivered to a horizontal conveyer 15, which, in turn, delivers it to the several feed-hoppers 31. The contents of the ore-treating cylinders, after having been subjected to rotation therein in the presence of chlorine or other gas for a sufficient period to effect the solution of the metal, are discharged through the openings governed by the doors 2 into desiccators or separating-chambers 16, one of which is secured to floor-beams or other proper supports below a chute or discharge-spout 17, located in proper position to deliver the contents of a cylinder 1 into an opening in the top of the desiccator, which is closed by a door or plate 18. A discharge-passage 19 in the lower end of the desiccator is closed by a movable filter-box 20, within which is placed a layer of filtering material, and a fluid-pressure pipe 21, governed by a regulating-valve, is led into the upper portion of the desiccator from a reservoir or generator of fluid under pressure—as water, steam, or compressed air—from the pump 11, by the admission of which to the desiccator the separation of the liquid and solid portions of its contents is effected, the former being discharged through pipes 22, governed by valves 23, into precipitating-vessels 24, supported upon the floor below the desiccators, and the latter, which is the waste solid residuum, being dropped, after the liquid has been expelled, into a car 25 or other suitable receptacle for removal by moving the filter-box 20 away from the discharge-passage 19.

The desiccator set forth corresponds in substance with that which forms the subject-matter of a separate application filed by me November 23, 1888, Serial No. 291,686, and is not, singly or specifically, claimed as of my present invention.

The separation of the precipitated metallic compound from the liquid supplied to the precipitating-vessels 24 is effected either by a centrifugal separator 29 or a filter-press 30, or by the combined and consecutive action of both, and the solid particles remaining after the liquid has been driven off are placed in a crucible and melted down in the usual manner. Each of the precipitating-vessels 24 is connected by a pipe 26, governed by a valve 27, with a liquid-delivery pipe 28, having branches furnished with proper valves leading to the centrifugal separator and to the filter-press, respectively. By the above construction the extraction of fine particles of precious metals from the liquids in which they are held in suspension is greatly expedited and much space economized as compared with former practice, and facilities are provided for the treatment which may be most desirable of solutions of different character. Thus, for example, finely-divided gold is found to be separated to the best advantage by a centrifugal separator, while with a bulky slimy precipitate the employment of a filter-press is preferable. Moreover, in some cases the major part of the liquid may be first expelled by the centrifugal separator, and the remainder be thereafter separated by the filter-press, the treatment of the liquid delivered from the separating-vessels being varied within the capacity of the plant, as circumstances may from time to time require.

The plant is simple and compact and admits of the daily working of a large quantity of ore, additional capacity being readily attainable, when desired, by the extension of the series of appliances in similar relation to that above described.

I claim as my invention and desire to secure by Letters Patent—

1. In a plant for the extraction of metals from ores, the combination of a rotatable ore-treating cylinder, a closed desiccator located below the cylinder, a precipitating-vessel located in position to receive liquid discharged from the desiccator, a separating appliance for extracting solid constituents from liquid with which they are mingled, and a pipe leading from the precipitating-vessel to said separating appliance, substantially as set forth.

2. In a plant for the extraction of metals from ores, the combination of a rotatable ore-treating cylinder, a closed desiccator located below the cylinder, a precipitating-vessel located in position to receive liquid discharged from the desiccator, a centrifugal separator, and a pipe leading from the precipitating-vessel to said centrifugal separator, substantially as set forth.

3. In a plant for the extraction of metals from ores, the combination of a rotatable ore-treating cylinder, a closed desiccator located below the cylinder, a precipitating-vessel located in position to receive liquid discharged from the desiccator, a centrifugal separator, a filter-press, and a pipe leading from the precipitating-vessel to independently-controlled connections with the centrifugal separator and the filter-press, respectively, substantially as set forth.

4. In a plant for the extraction of metals from ores, the combination of a series of rotatable ore-treating cylinders, a series of feed or supply hoppers, each located above one of said cylinders, a series of absorbing-tanks, each connected by a pipe with one of said cylinders, a series of ejectors, each interposed in one of said connecting-pipes, a series of desiccators, each located below one of said cylinders, a series of precipitating-vessels located in position to receive liquid discharged from the desiccators, a separating appliance for extracting solid constituents from liquid with which they are mingled, a pipe leading from the precipitating-vessels to said separating appliance, an elevator arranged in position to raise a supply of ore to the level of the feed-hoppers, and a conveyer for transferring ore from the elevator to the several feed-hoppers of the series, substantially as set forth.

In testimony whereof I have hereunto set my hand.

GEORGE W. GOETZ.

Witnesses:
J. SNOWDEN BELL,
R. H. WHITTLESEY.